US007187631B2

(12) United States Patent
Minechika et al.

(10) Patent No.: US 7,187,631 B2
(45) Date of Patent: Mar. 6, 2007

(54) DISC APPARATUS FOR REPRODUCING A SIGNAL ON A DISC USING A LASER BEAM

(75) Inventors: Shigekazu Minechika, Osaka (JP); Hideaki Yano, Osaka (JP); Keiji Nagata, Osaka (JP); Yoshihiro Aoi, Nara (JP); Ichizo Sakamoto, Hyogo (JP); Kenji Asano, Gifu (JP); Tadashi Okajima, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 62 days.

(21) Appl. No.: 10/250,680

(22) PCT Filed: Jan. 9, 2002

(86) PCT No.: PCT/JP02/00060

§ 371 (c)(1),
(2), (4) Date: Jul. 16, 2003

(87) PCT Pub. No.: WO02/058058

PCT Pub. Date: Jul. 25, 2002

(65) Prior Publication Data

US 2005/0088930 A1 Apr. 28, 2005

(30) Foreign Application Priority Data

Jan. 19, 2001 (JP) .............................. 2001-012183

(51) Int. Cl.
*G11B 7/00* (2006.01)
(52) U.S. Cl. .............................. 369/44.29; 369/44.35; 369/53.31
(58) Field of Classification Search ............. 369/53.28, 369/44.35, 44.36, 53.31, 44.29, 44.25, 47.5–47.53, 369/116
See application file for complete search history.

(56) References Cited

U.S. PATENT DOCUMENTS

| 5,172,352 A | * | 12/1992 | Kobayashi ............... 369/53.22 |
| 5,187,696 A | * | 2/1993 | Ishii et al. ............... 369/44.29 |
| 5,379,282 A | * | 1/1995 | Wachi ..................... 369/44.35 |
| 5,606,536 A | * | 2/1997 | Watanabe et al. ........ 369/44.36 |

(Continued)

FOREIGN PATENT DOCUMENTS

| CN | 1121624 A | 5/1996 |
| CN | 1254158 A | 5/2000 |
| JP | 58-158045 | 9/1983 |
| JP | 2-12617 | 1/1990 |
| JP | 4-23226 | 1/1992 |

(Continued)

OTHER PUBLICATIONS

Machine Translation of Fujimori (JP 2000-260046).*

*Primary Examiner*—Andrea Wellington
*Assistant Examiner*—Peter Vincent Agustin
(74) *Attorney, Agent, or Firm*—Westerman, Hattori, Daniels & Adrain, LLP.

(57) ABSTRACT

A disc apparatus (10) includes an optical lens (14). A laser beam is irradiated onto a recording surface of the magneto-optical disc (68) through the optical lens (14), and a TE signal or an RF signal is detected on the basis of the laser beam reflected by the recording surface. Herein, an MPU (50) replaces the optical lens (14) in an optical axis direction, and a TE signal detection circuit (42) or an RF signal detection circuit (60) detects the TE signal or the RF signal at each of lens positions. A laser power is adjusted by the MPU (50) such that amplitude of each of the TE signal or the RF signal detected is below a saturation value. When a parameter is adjusted, a position of the optical lens (14) is controlled such that the amplitude of the TE signal or the RF signal detected thereafter is maximized.

3 Claims, 15 Drawing Sheets

U.S. PATENT DOCUMENTS

| | | | |
|---|---|---|---|
| 5,862,111 A * | 1/1999 | Arai | 369/44.36 |
| 5,946,287 A * | 8/1999 | Nakayama et al. | 369/275.4 |
| 6,714,493 B1 * | 3/2004 | Kishimoto et al. | 369/44.38 |

FOREIGN PATENT DOCUMENTS

| | | |
|---|---|---|
| JP | 06-243488 | 9/1994 |
| JP | 2001-23165 | 1/2001 |

* cited by examiner (A) 1100110011001100110011001100······

(B) 1111111100000000111111110000000······

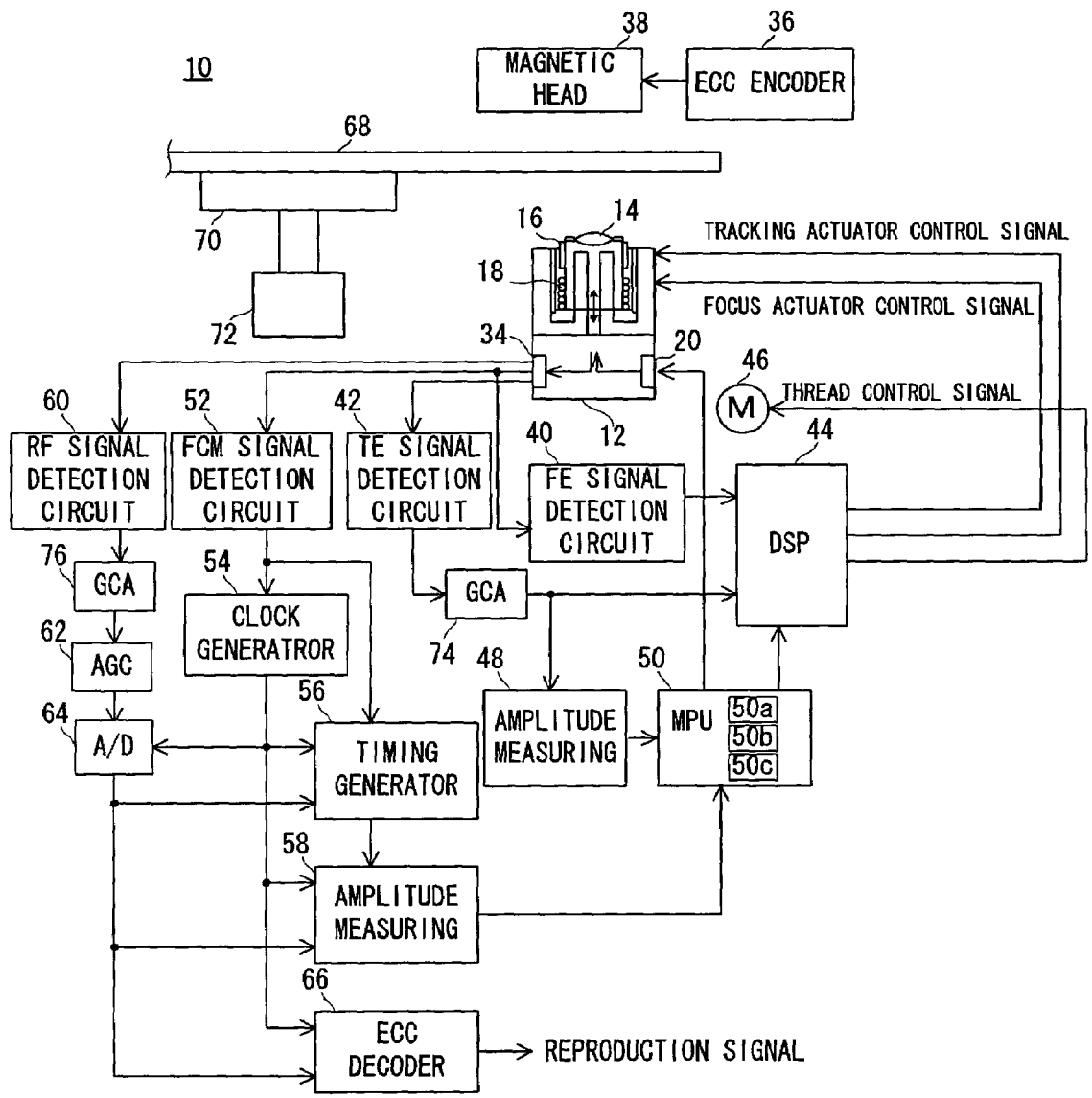

DISC APPARATUS FOR REPRODUCING A SIGNAL ON A DISC USING A LASER BEAM

TECHNICAL FIELD

The present invention relates to a disc apparatus. More specifically, the present invention relates to a disc apparatus which irradiates a laser beam onto a recording surface of a disc recording medium through a lens and detects a predetermined signal on the basis of the laser beam reflected by said recording surface.

PRIOR ART

In such kind of a disc apparatus, a laser beam emitted from a laser diode is irradiated onto a recording surface of a disc recording medium through an optical system, and the laser beam reflected by the recording surface is detected by a photodetector through the optical system. Then, a TE (Tracking Error) signal or an RF (Radio Frequency) signal is generated on the basis of an output of the photodetector.

However, if there occurs displacement in the optical system, an optical path of the laser beam is deviated from an original path, and it is impossible to accurately set a focus on the basis of an FE (Focus Error) signal. Thereupon, there is a fear that the TE signal or the RF signal cannot be adequately detected, and an operation becomes unstable. For example, the number of tracks stridden by the laser beam needs to be counted on the basis of the TE signal at a time of a seeking control; however, if the TE signal is not adequately detected because of the focus not being accurately set, there is a fear that a target track is not accurately sought. In addition, a reproduction signal needs to be generated by decoding the RF signal at a time of reproducing; however, if the RF signal is not adequately detected because of the focus not being accurately set, there is a fear that an error rate of the reproduction signal becomes high.

SUMMARY OF THE INVENTION

Therefore, it is a primary object of the present invention to provide a novel disc apparatus.

Another object of the present invention is to provide a disc apparatus capable of adequately detecting a predetermined signal from a laser beam reflected by a recording surface.

According to the present invention, a disc apparatus which irradiates a laser beam onto a recording surface of a disc recording medium through a lens and detects a predetermined signal on the basis of the laser beam reflected by the recording surface comprises: a displacing means for displacing the lens in an optical axis direction; a detecting means for detecting the predetermined signal at each of lens positions displaced by the displacing means; an adjusting means for adjusting such that amplitude of each of the predetermined signals detected by the detecting means is below a saturation value, a parameter relating to the amplitude; and a controlling means for controlling the lens position such that the amplitude of the predetermined signal detected after an adjustment of the parameter by the adjusting means is made maximum.

The laser beam is irradiated onto the recording surface of the disc recording medium through the lens, and the detected signal is detected on the basis of the laser beam reflected by the recording surface. At this time, the displacing means displaces the lens in the optical axis direction, and the detecting means detects the predetermined signal at each of the displaced lens positions. The parameter relating to the amplitude of the predetermined signal is adjusted by the adjusting means such that the amplitude of each of the detected predetermined signals is below the saturation value. When the parameter is adjusted, the lens position is controlled by the controlling means such that the amplitude of the predetermined signal detected thereafter is maximized. Therefore, it is possible to adequately detect the predetermined signal.

The adjusting means may adjust a power of a semiconductor laser which emits the laser beam.

Furthermore, in a case of applying a gain to the detected predetermined signal by an applying means, the adjusting means may adjust the gain.

The predetermined signal is preferably an RF signal.

In a case embossment processing is performed on the recording surface, the predetermined signal may be an embossment signal.

In a case a track is formed on the recording surface by the embossment processing the embossment signal is preferably a tracking error signal.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10(A) is an illustrative view showing a data value written to a short mark field;

FIG. 10(B) is an illustrative view showing a data value written to a long mark field;

FIG. 19 is a flowchart showing a configuration of another embodiment of the present invention.

BEST MODE FOR PRACTICING THE INVENTION

Figure 1:
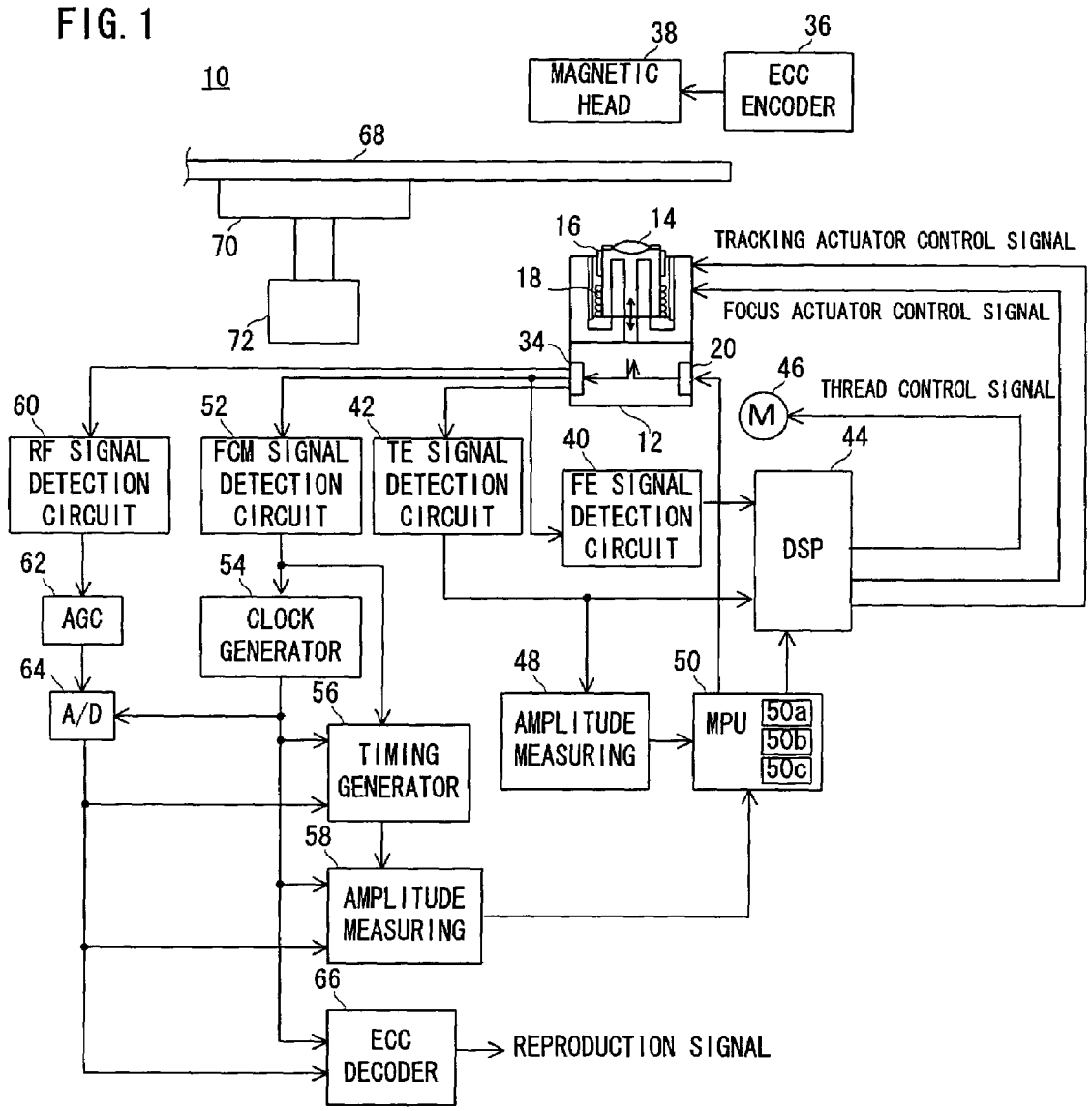
FIG. 1 is a block diagram showing a configuration of one embodiment of the present invention.

Referring to FIG. 1, an optical disc apparatus 10 of this embodiment includes an optical pickup (optical system) 12 in which an optical lens 14 is provided. The optical lens 14 is supported by a tracking actuator 16 and a focus actuator 18. A laser beam emitted from a laser diode 20 is irradiated onto a recording surface of a magneto-optical disc 68 such as ASMO (Advanced Storage Magneto Optical disc) through optical members shown in FIG. 2. In recording, a pulse-modulated leaser beam is emitted from the laser diode 20, and in reproducing, a laser beam to which a high frequency is superposed is emitted from the laser diode 20. Furthermore, in recording, a recording signal output from an ECC encoder 36 is applied to a magnetic head 38 by which the magneto-optical disc 68 is magnetized.

Figure 5:
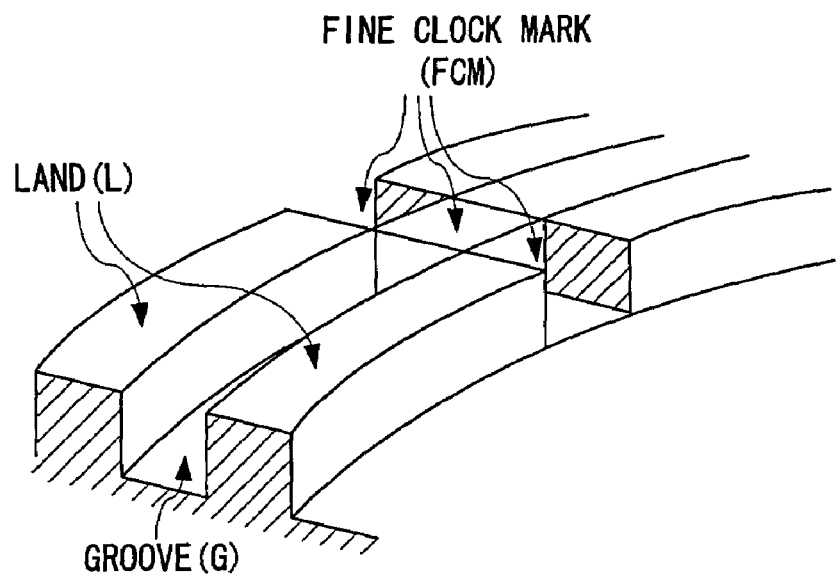
FIG. 5 is an illustrative view showing a shape of the recording surface of a magneto-optical disc.

The magneto-optical disc 68 is mounted on a spindle 70 and rotated by a spindle motor 72. The magnet-optical disc 68 is a disc complied with a ZCLV (Zone Constant Linear Velocity) system, and a rotating speed decreases as the optical pickup 12 is moved from an inner radius to an outer radius. Furthermore, the magneto-optical disc 68 is on its recording surface alternately formed with a land track and a groove track as shown in FIG. 5 in a radius direction, and each track is formed with an FCM (Fine Clock Mark) at a predetermined interval in an embossment manner. More specifically, the land track is formed in a convex shape, and the FCM on the land track is formed in a concave shape. On the contrary thereto, the groove track is formed in a concave shape, and the FCM on the groove track is formed in a convex shape. In addition, the disc apparatus 10 in this embodiment adopts an FAT system or a UDF system, and the signal output from the ECC encoder 36 is intermittently recorded in available areas dispersedly formed on the recording surface.

Figure 2:
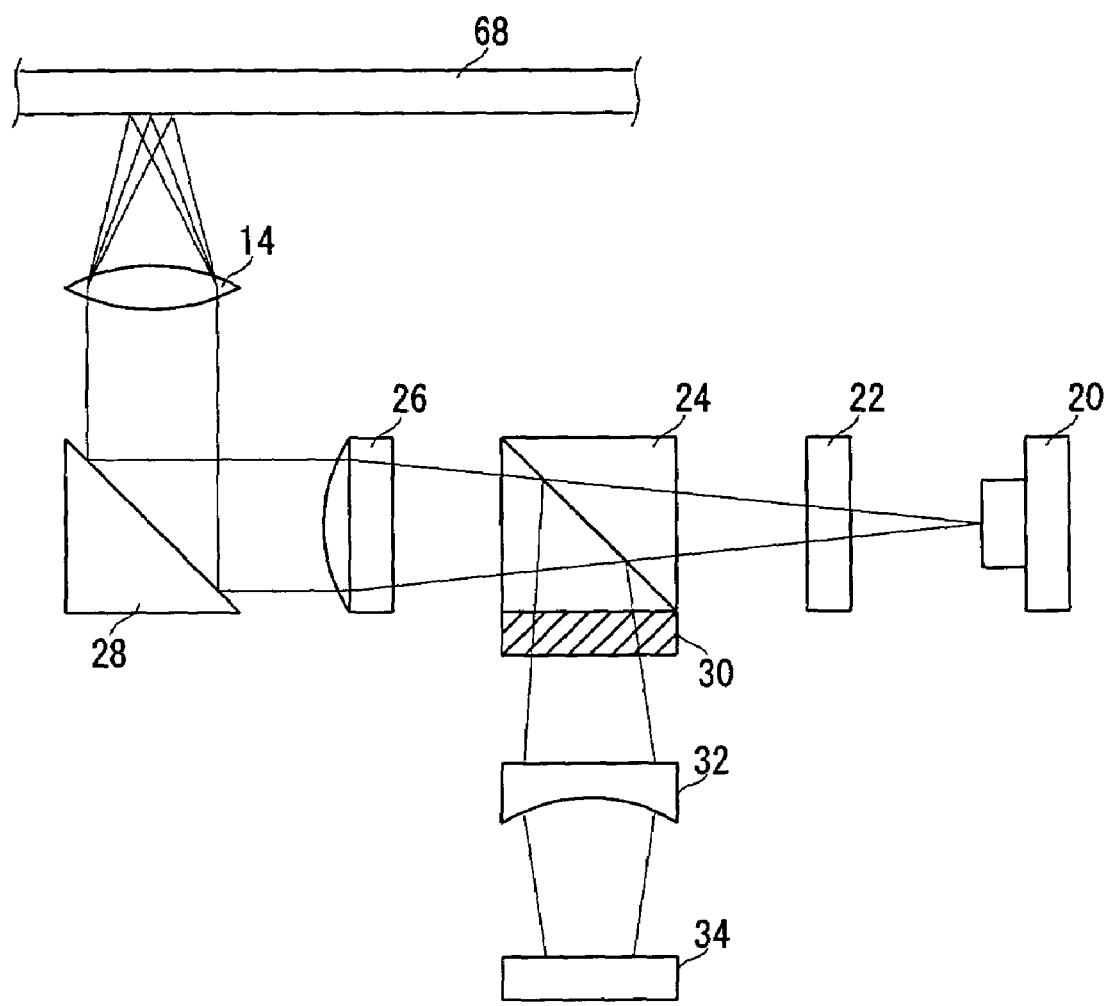
FIG. 2 is an illustrative view showing a part of a construction of an optical pickup.
Figure 3:
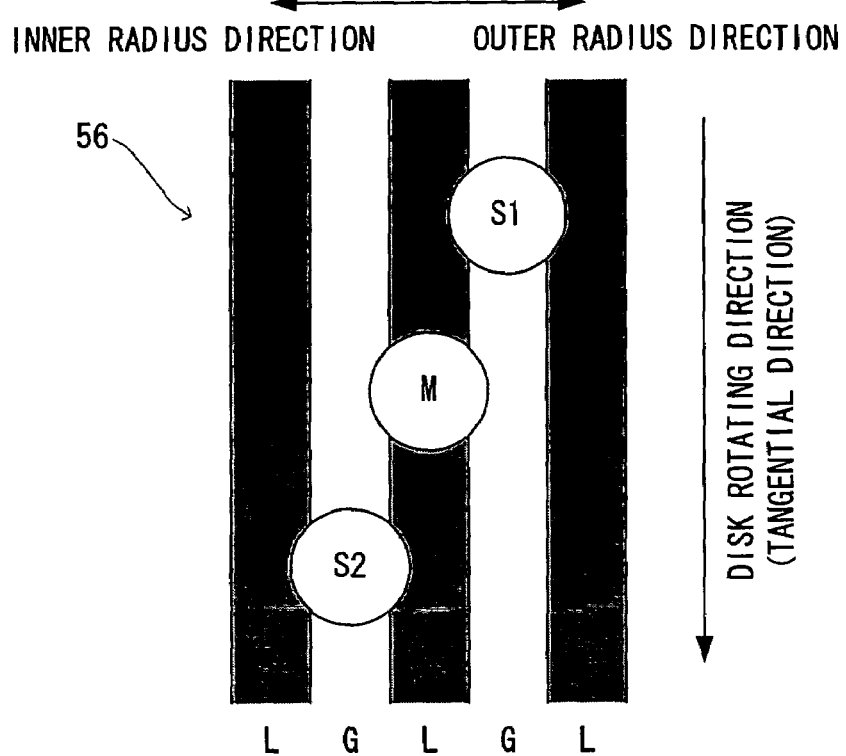
FIG. 3 is an illustrative view showing a state that a main beam and sub-beams are irradiated onto a recording surface.

Referring to FIG. 2, the laser beam emitted from the laser diode 20 is divided by a grating 22. This generates one main beam M and two sub-beams S1 and S2. These beams are irradiated onto a rising mirror 28 through a beam splitter 24 and a collimator lens 26. The beam reflected by the rising mirror 28 is converged by the optical lens 14 and then irradiated onto the recording surface of the magneto-optical disc 56 as shown in FIG. 3. The main beam M is irradiated onto a desired track, and the sub-beams S1 and S2 are irradiated onto both tracks adjacent to the desired track. It is noted that "L" and "G" shown in FIG. 3 mean the land track and the groove track, respectively.

The main beam and the sub-beams S1 and S2 reflected by the recording surface are returned to the beam splitter 24 through the optical lens 14, the rising mirror 28 and collimator lens 26 in reverse to the above-described path. The main beam M and the sub-beams S1 and S2 incident to the beam splitter 24 are irradiated onto a photodetector 34 through a Wallaston prism 30 complied with a three beam system and a plano-concave lens 32.

When emitted from the Wallaston prism 30, each of the main beam M and the sub-beams S1 and S2 are divided into three. That is, the main beam M is divided into Ma, Mb and Mc, the sub-beam S1 is divided into S1a, S1b and S1c, and the sub-beam S2 is divided into S2a, S2b and S2c. The beam Ma has the same component as the main beam M while the beam Mb has only a vertical deflection component of the main beam M, and the beam Mc has only a horizontal deflection component of the main beam M. The same is true for the sub-beams S1 and S2, and the beam S1a (S2a) has the same component as the sub-beam S1 (S2) while the beam S1b (S2b) has only the vertical deflection component of the sub-beam S1 (S2), and the beam S1c (S2c) has only the horizontal deflection component of the sub-beam S1 (S2).

Figure 4:
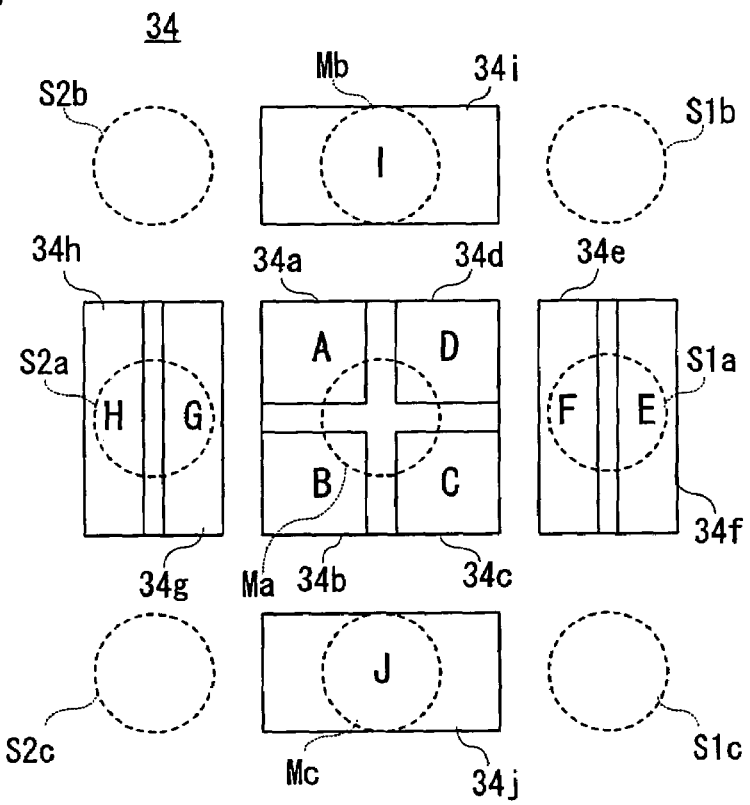
FIG. 4 is an illustrative view showing a configuration of a photodetector.

The photodetector 34 is configured as shown in FIG. 4. The beam Ma is detected by detecting elements 34a to 34d, and the beams Mb and Mc are detected by detecting elements 34i and 34j, respectively. On the one hand, the beam S1a is detected by detecting elements 34e and 34f, and the beam S2a is detected by the detecting elements 34g and 34h. On the other hand, beams 1b, 1c, 2b and 2c are not detected by any detecting elements.

Returning to FIG. 1, an FE signal detection circuit 40 performs an operation according to an equation 1 on outputs of the detecting elements 34a to 34d so as to detect an FE signal. A TE signal detection circuit 42 performs an operation according to an equation 2 on outputs of the detecting element 34a to 34h so as to detect a TE signal in a DPP (Difference Push Pull) system. An FCM detection circuit 52 performs an operation according to an equation 3 on outputs of the detecting elements 34a to 34d so as to detect an FCM signal. An RF signal detection circuit 60 performs an operation according to an equation 4 on outputs of the detecting elements 34i and 34j so as to detect an RF signal.

It is noted that "A" to "J" in the equations 1 to 4 are respectively corresponding to outputs of the detecting elements 34a to 34j. Furthermore, a reproduction signal is generated on the basis of the RF signal and therefore, the RF signal may be defined as an MO signal.

$$FE = (A+C) - (B+D) \qquad [\text{equation 1}]$$

$$TE = \{(A+B) - (C+D)\} - \alpha\{(E+H) - (F+G)\} \qquad [\text{equation 2}]$$

$$FCM = (B+C) - (A+D) \qquad [\text{equation 3}]$$

$$RF = I - J \qquad [\text{equation 4}]$$

The FE signal output from the FE signal detection circuit 40 is input to a DSP (Digital Signal Processor) 44. The DSP 44 executes a focus servo on the basis of the input FE signal and generates a focus control signal. The generated focus control signal is applied to the focus actuator 18 and whereby, a focus, i.e., a position of the optical lens 14 in the optical axis direction is adjusted.

The TE signal output from the TE signal detection circuit 42 is also applied to the DSP 44. The DSP 44 performs a seek process or a tracking control process on the basis of the applied TE signal so as to generate a tracking actuator control signal and a thread control signal. The tracking actuator control signal is applied to the tracking actuator 16, and the thread control signal is applied to a thread motor 46. Therefore, a position of the optical lens 14 in the radius direction, and a rotating speed and a rotating direction of the thread motor 46 are controlled. The TE signal is also input to an amplitude measuring circuit 48 so as to measure amplitude of the TE signal. The measured amplitude is applied to an MPU 50.

The FCM signal output from the FCM detection circuit 52 is applied to a clock generator 54. The clock generator 54 generates a clock signal by a PLL (Phase Lock Loop) control based on the FCM signal, and an A/D converter 64, a timing generator 56, an amplitude measuring circuit 58 and an ECC decoder 66 are operated in response to the clock signal generated by the clock generator 54.

The RF signal output from the RF signal detection circuit 60 is applied to the timing generator 56, the amplitude measuring circuit 58 and the ECC decoder 66 through a level adjustment by an AGC (Automatic Gain Control) circuit 62 and an A/D conversion by the A/D converter 64. The timing generator 56 generates a timing signal based on the RF signal and the FCM signal respectively applied from the A/D converter 64 and the FCM signal detection circuit 52. The amplitude measuring circuit 58 measures amplitude of the RF signal when a timing signal of high level is input from the timing generator 56 and applies the measured amplitude to the MPU 50. The ECC decoder 66 performs a predetermined decoding process on the applied RF signal so as to generate a reproduction signal.

Figure 7:
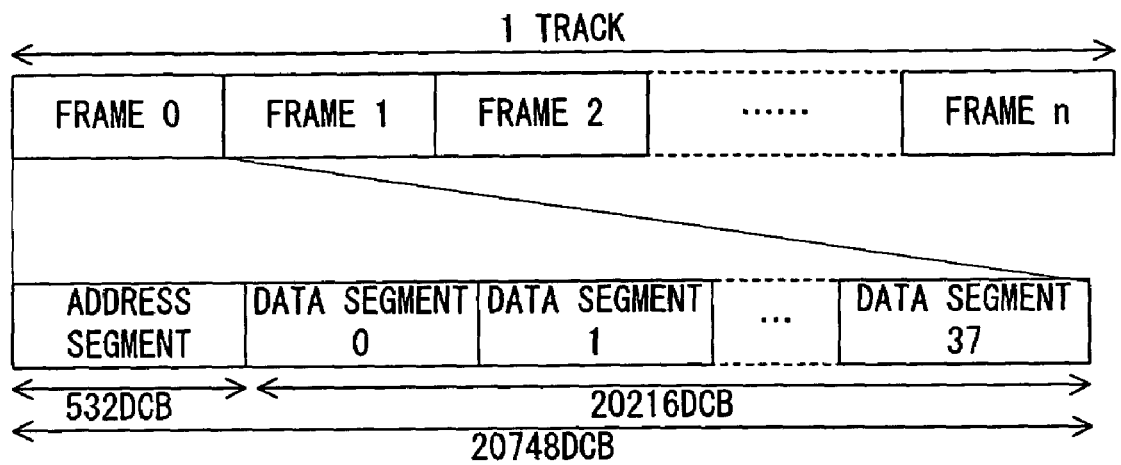
FIG. 7 is an illustrative view showing a data structure of an RF signal.
Figure 8:
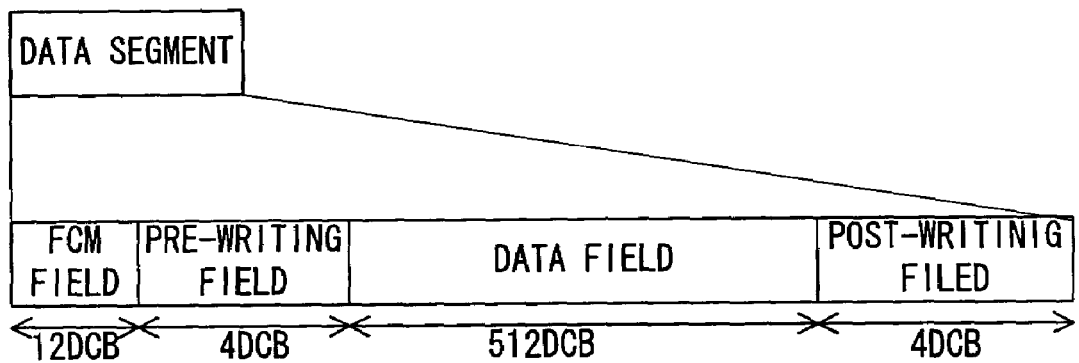
FIG. 8 is an illustrative view showing a structure of a data segment.
Figures 9, 10:
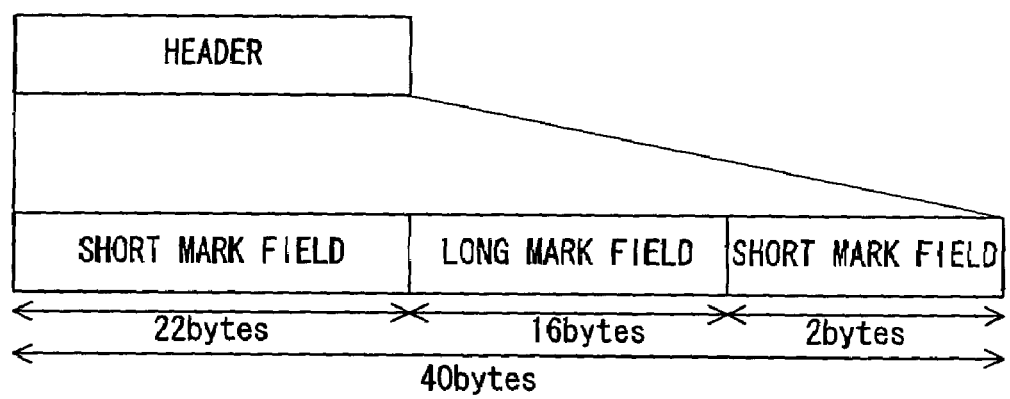
FIG. 9 is an illustrative view showing a structure of head data.

A data structure of the RF signal is shown in FIG. 7 to FIG. 9. As shown in FIG. 7, one track is constructed by a plurality of frames each of which has one address segment and 38 data segments. One frame has 20748DCB (Data Channel Bit), and out of this, 532 DCB is assigned for the address segment and the rest of 20216DCB is assigned for the data segments 0 to 37. The data segment is constructed by an FCM field, a pre-write field, a data field and a post-write field as shown in FIG. 8. The FCM field is assigned with 12DCB, the pre-write field is assigned with 4DCB, the data field is assigned with 512DCB, and the post-write field is assigned with 4DCB. It is noted that the FCM shown in FIG. 5 corresponds to the FCM field.

That is, each frame has 38 data fields, and header data and main data in each filed are constructed by these data fields. The header data is written to the data field in the data segment 0 and specifically formed as shown in FIG. 9. That is, the header data is formed by 40 bytes (=40 DCB), and 22 bytes from the head and 2 bytes from the end are respectively assigned with short mark fields, and the rest of 16 bytes are assigned with a long mark field. The short mark field is a repeat of "11" and "00" as shown in FIG. 10 (A), and the long mark field is a repeat of "11111111" and "00000000" as shown in FIG. 10(B).

Figure 6:
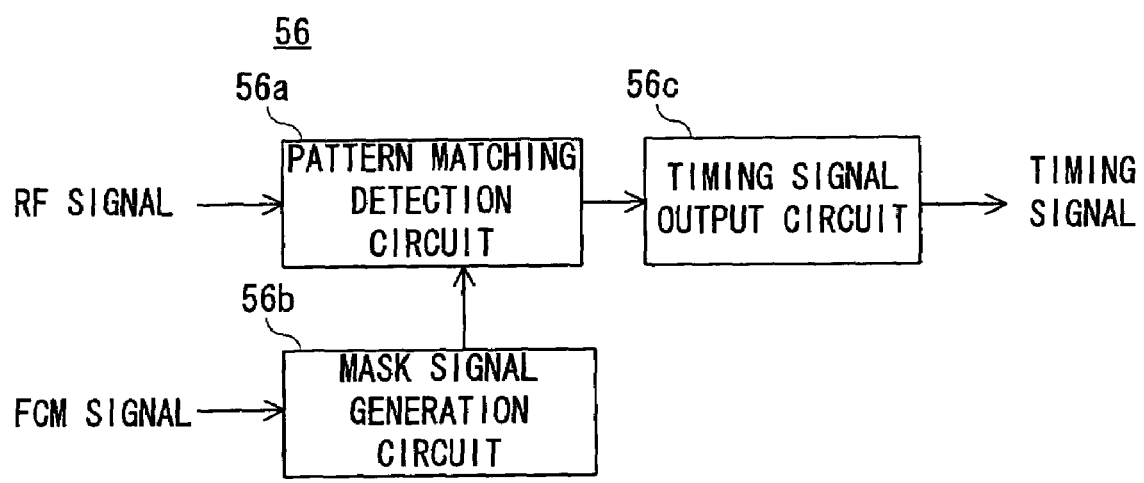
FIG. 6 is a block diagram showing a configuration of a timing generator.

The timing generator 56 is specifically constructed as shown in FIG. 6. A gate signal generation circuit 56b renders a gate signal a high level during a 64 DGB period from the head of the pre-write field shown in FIG. 8 on the basis of the FCM signal. The FCM field is assigned not only to the data segments 0 to 37 but also to the address segment shown in FIG. 7, and the gate signal becomes a high level during the above-described 64 DGB period in each segment. Thus, a time period over which the gate signal becomes the high level in the data segment 0 necessarily includes a header data period shown in FIG. 9.

A pattern matching detection circuit 56a is activated when the gate signal indicates the high level and performs a matching the RF signal input from the A/D converter 64 to "11111111". The header data assigned to the data segment 0 has a long mark field shown in FIG. 10 (A), and therefore, when the long mark field is input to the pattern matching detection circuit 56a, a result of the matching shows "ACCORD". The result of the matching is applied to a timing signal output circuit 56c, and the timing signal output circuit 56c renders the timing signal the high level during an 8 bits period from the input of the result of the matching indicative of "ACCORD".

The amplitude measuring circuit 58 is provided with a delay circuit not shown by which the RF signal output from the A/D converter 64 is delayed for an 8 bits period. The amplitude measuring circuit 58 measures a level of the RF signal delayed by the delay circuit while the timing signal of high level is applied. Therefore, amplitude of the RF signal indicating "11111111" is measured.

Returning to FIG. 1, the MPU 50 fetches the amplitude of the TE signal from the amplitude measuring circuit 48 in a state the focus servo is turned on and the tracking servo is turned off, and detects a defocus value (focus offset value) in which the TE amplitude is maximized. More specifically, the focus servo is executed in a state that defocus values different from each other are set in the DSP 44, and then, the amplitudes of the TE signal detected by the respective defocus values are fetched. Then, the defocus value having the fetched amplitude maximum is determined to be an optimal defocus value DFte.

The MPU 50 further fetches the amplitude of the RF signal from the amplitude measuring circuit 58 in a state the focus servo is turned on and the tracking servo with respect to the land track or the groove track is turned on, and detects the focus value having the RF amplitude maximum. Therefore, an optimal defocus value DFrfl in which the amplitude of the RF signal in the land track is maximized and an optimal defocus value DFrfg in which the amplitude of the RF signal in the groove track is maximized are obtained.

In a seek process, the optimal defocus value DFte determined based on the TE signal is set in the DSP 44, and in a decode process (in tracking control), the optimal defocus value DFrfl or DFrfg is set in the DSP 44. Thus, the focus servo in the seek process is executed on the basis of the FE signal and the optimal defocus value DFte, and the focus servo in the decode process is executed on the basis of the FE signal and the optimal defocus value DFrfl or DFrfg. Consequently, in the seek process, the focus is controlled so that the amplitude of the TE signal is maximized, and in the decoding process, the focus is controlled so that the amplitude of the RF signal is maximized.

It is noted that the DSP 44 also executes a spindle servo in addition to the above-described focus servo, tracking servo and thread servo. By this servo process, a rotation of the spindle motor 72 is controlled so that a period of an FG pulse output from the spindle motor 72 indicates a predetermined value.

Figure 17:
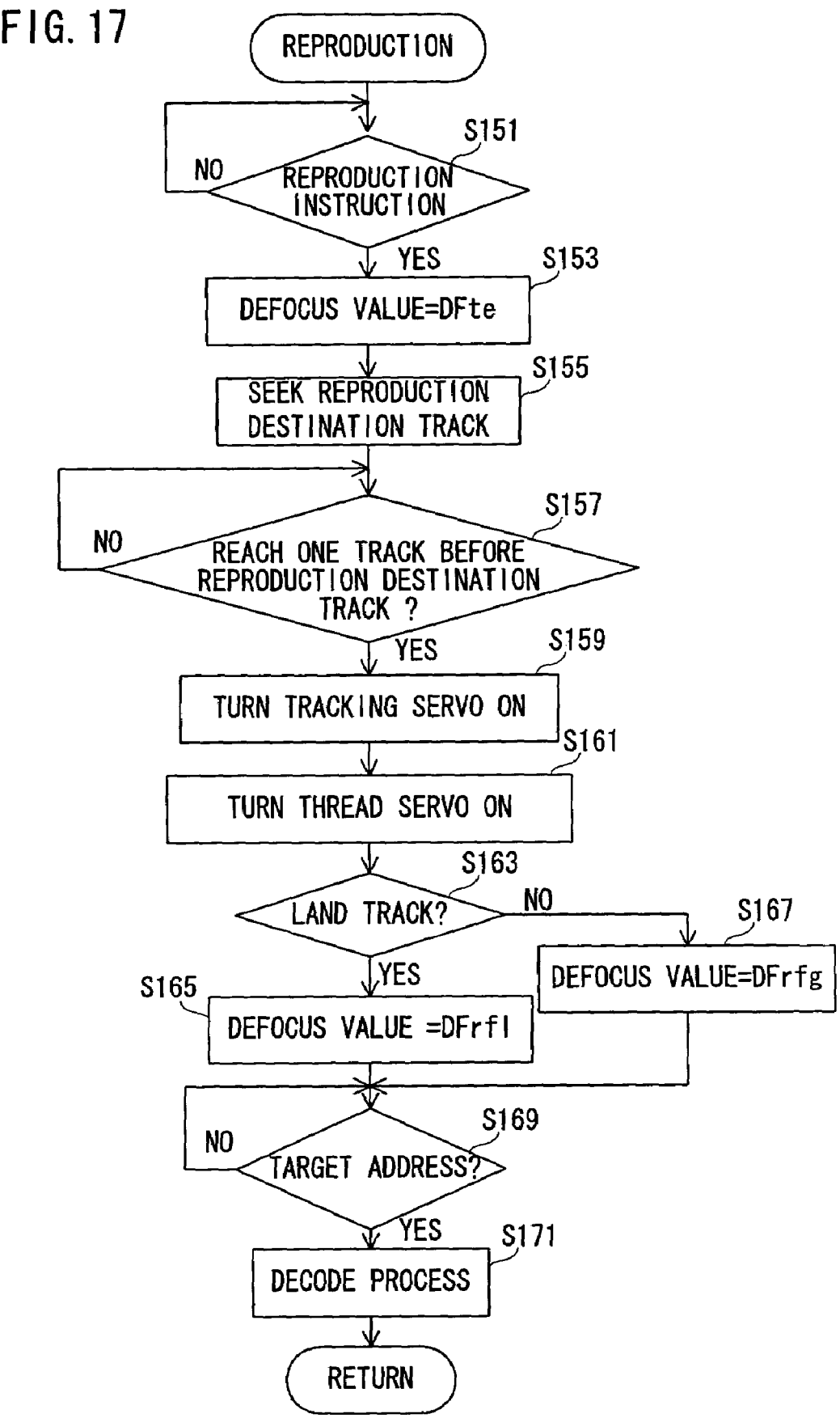
FIG. 17 is a flowchart showing a part of an operation of the MPU when a reproducing process is performed.

The MPU 50 specifically operates according to flowcharts shown in FIG. 11 to FIG. 17. Out of these, the flowcharts shown in FIG. 11 to FIG. 16 are processed at a time of determining the defocus value, and the flowchart shown in FIG. 17 is processed at a time of reproducing.

Figure 11:
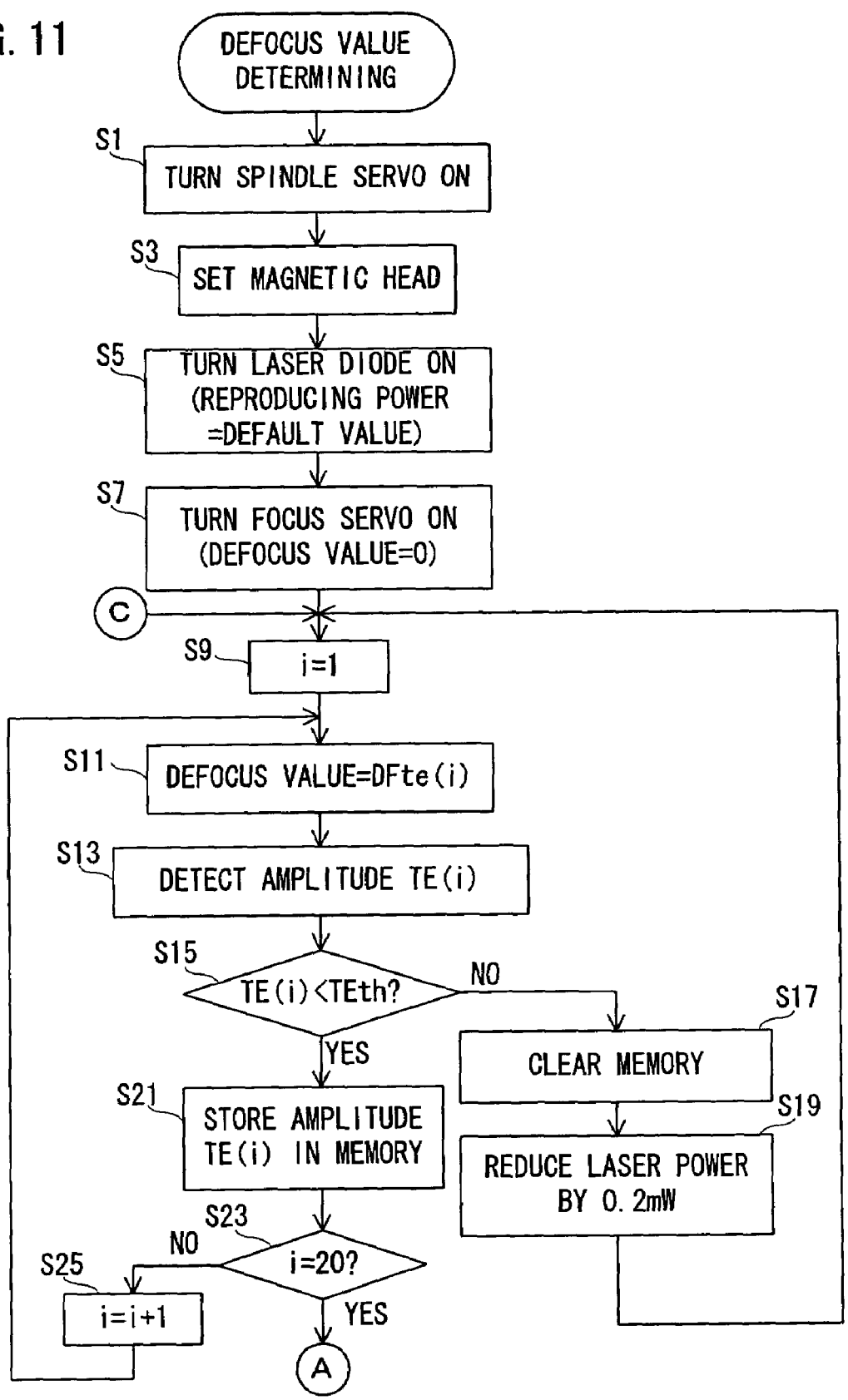
FIG. 11 is a flowchart showing a part of an operation of an MPU when a focus offset value (defocus value) is detected.
Figure 12:
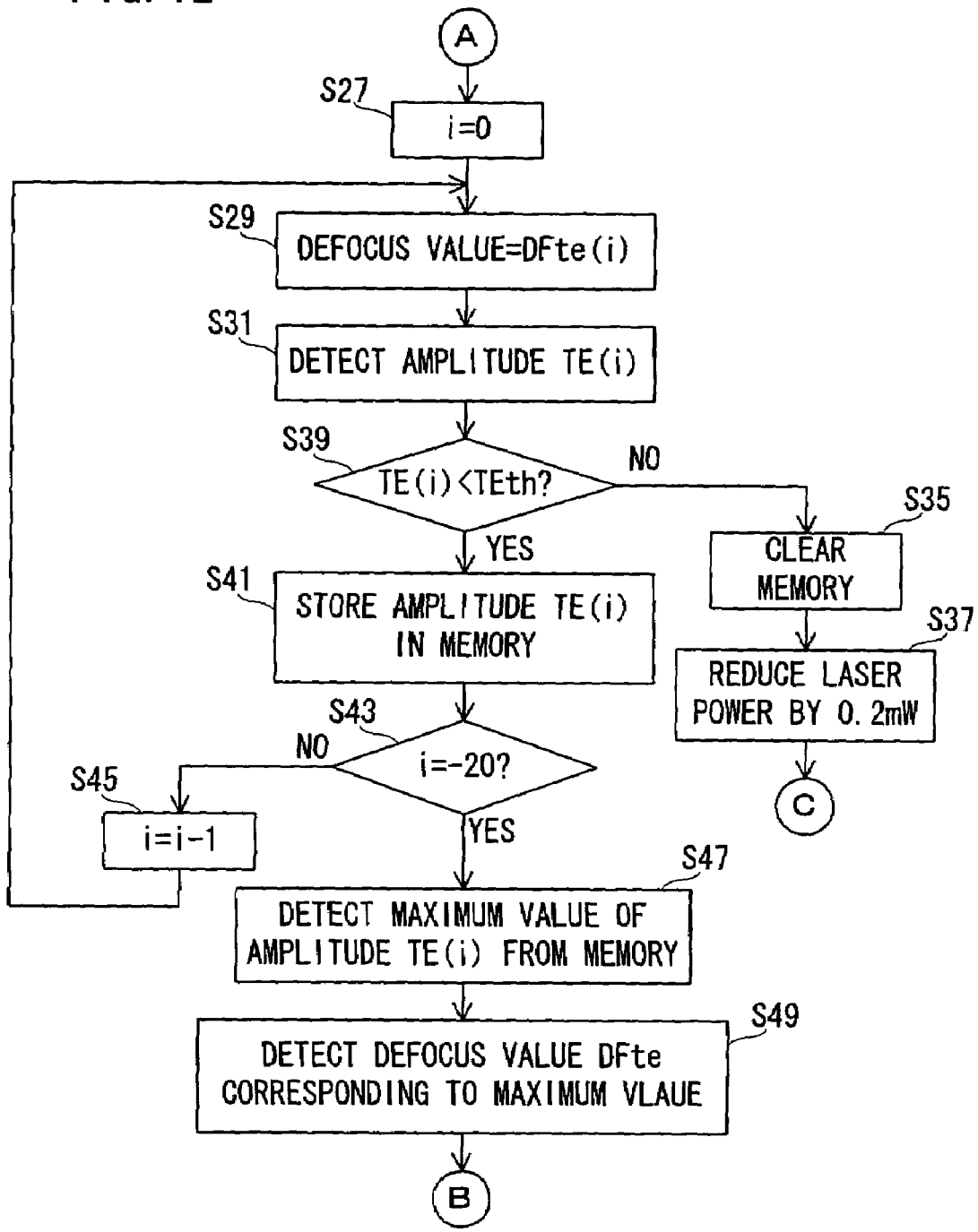
FIG. 12 is a flowchart showing another part of the operation of the MPU when the focus offset value (defocus value) is detected.
Figure 13:
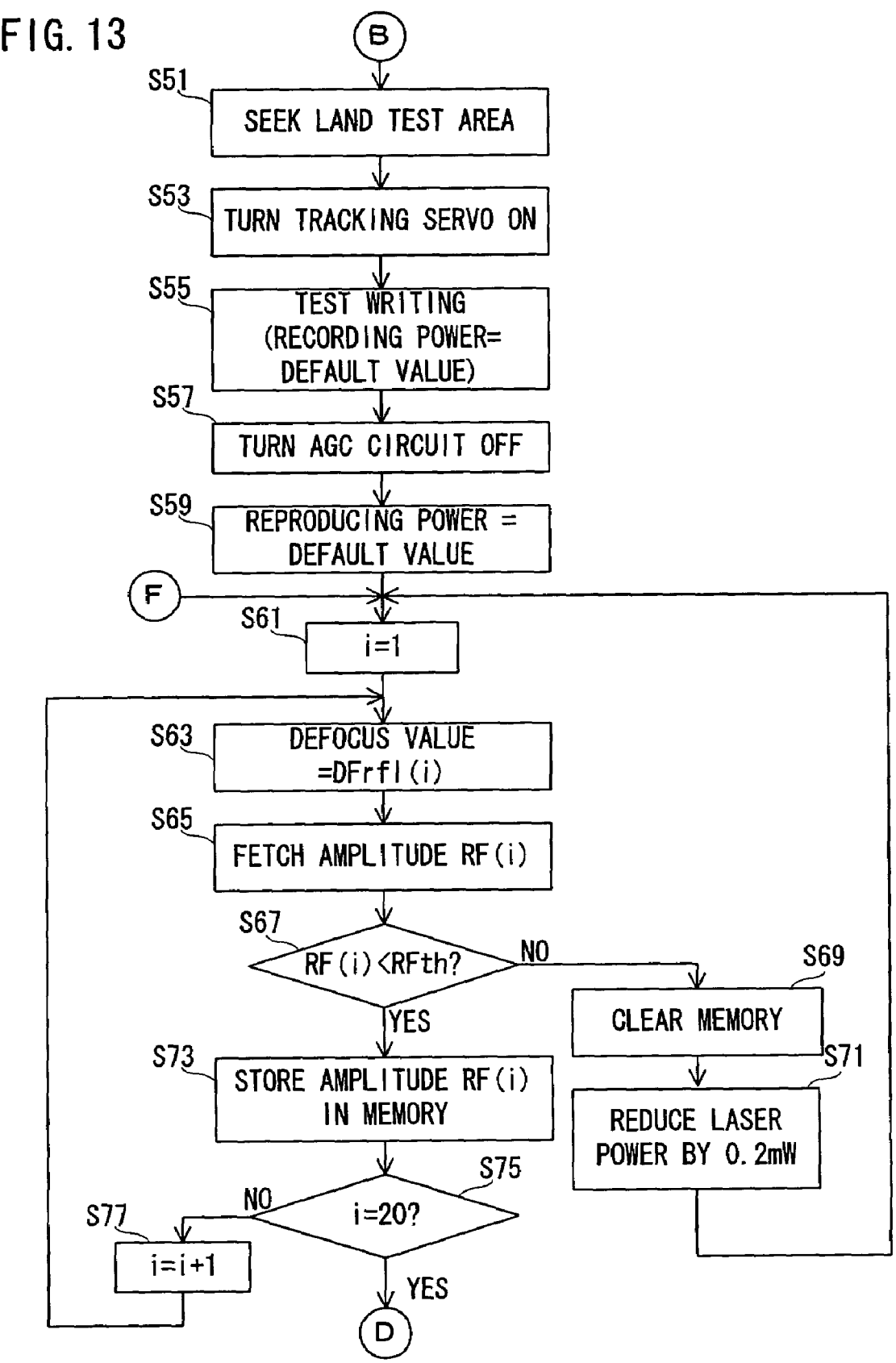
FIG. 13 is a flowchart showing the other part of the operation of the MPU when the focus offset value (defocus value) is detected.
Figure 14:
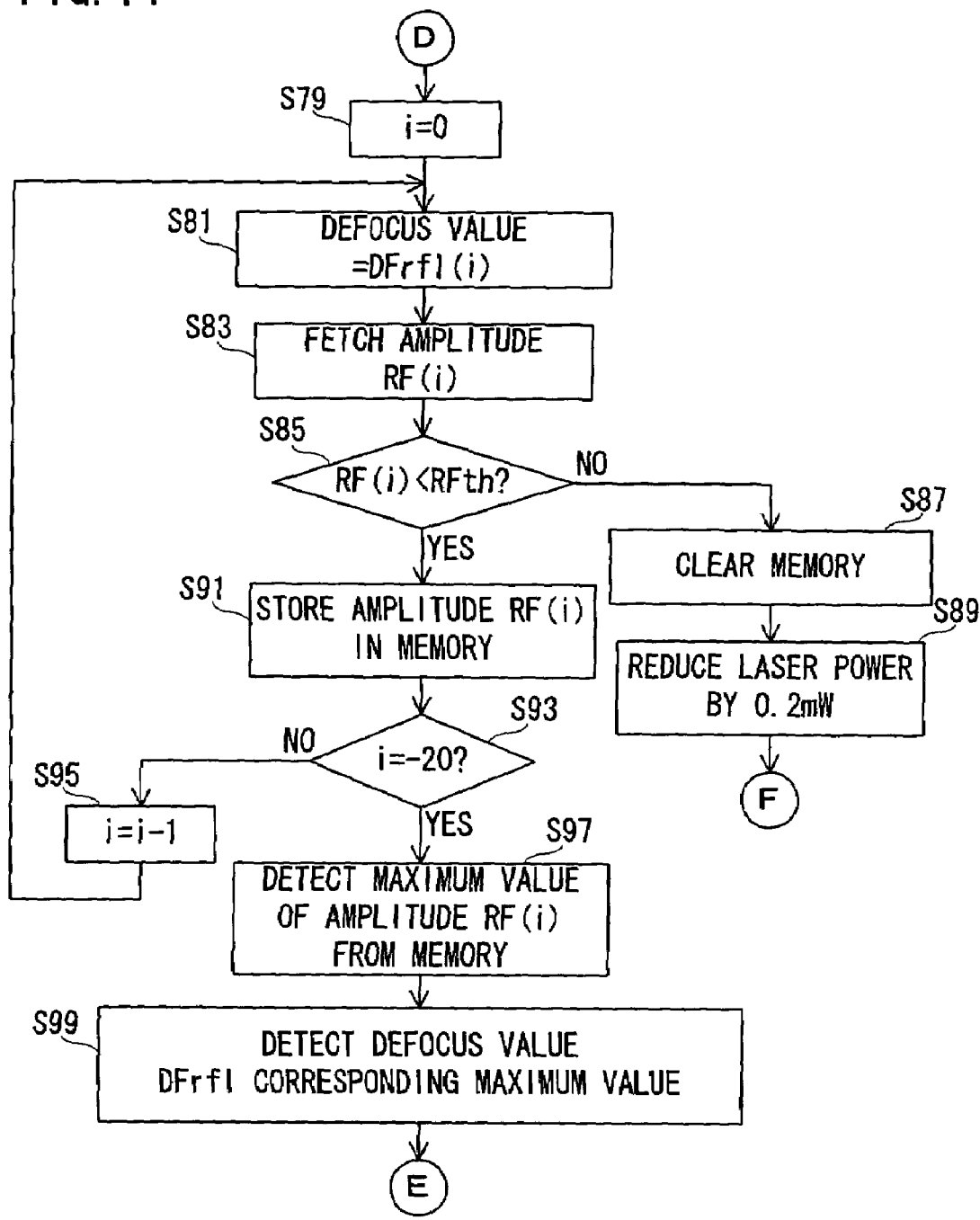
FIG. 14 is a flowchart showing a further part of the operation of the MPU when the focus offset value (defocus value) is detected.
Figure 15:
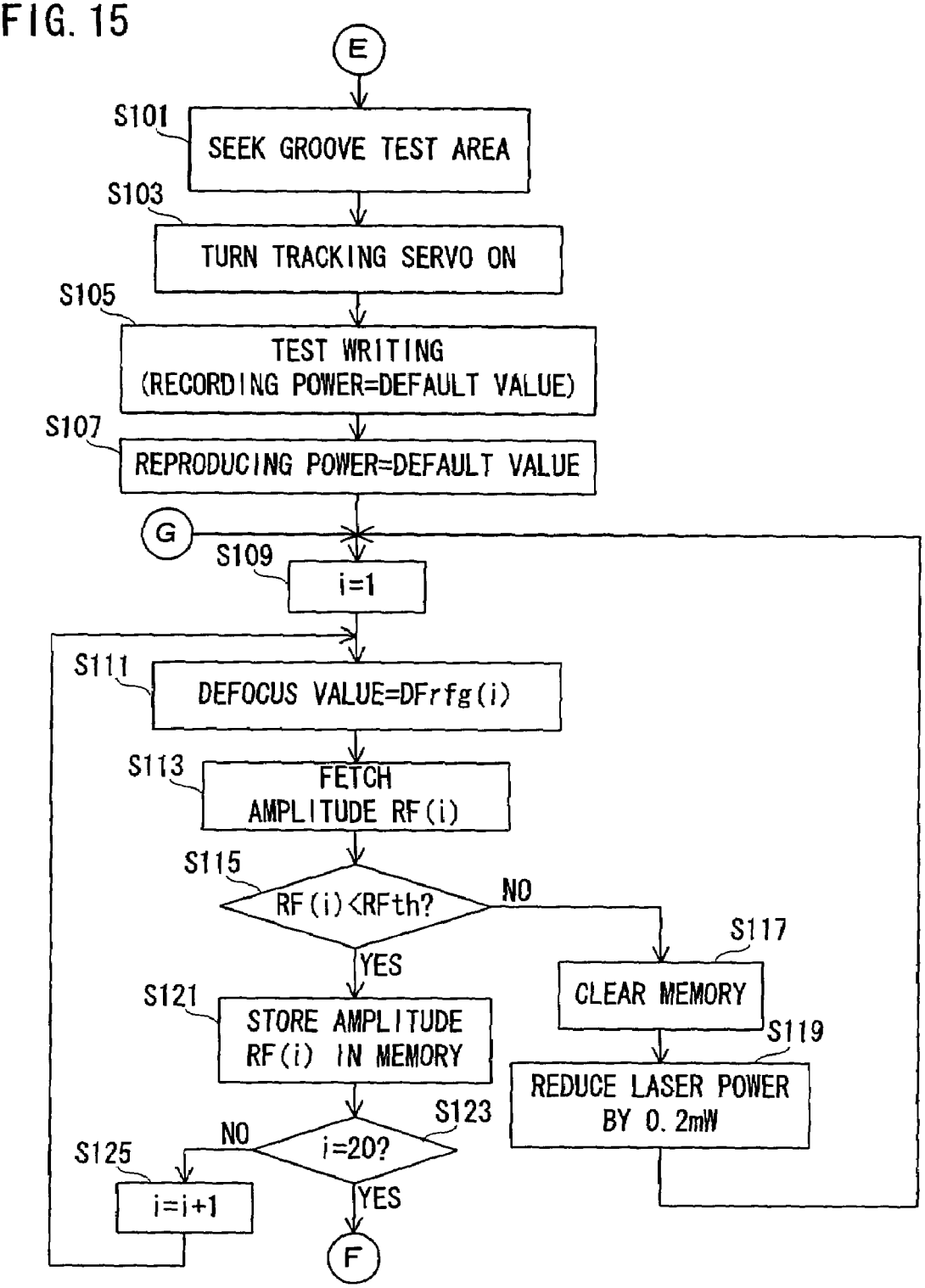
FIG. 15 is a flowchart showing another part of the operation of the MPU when the focus offset value (defocus value) is detected.
Figure 16:
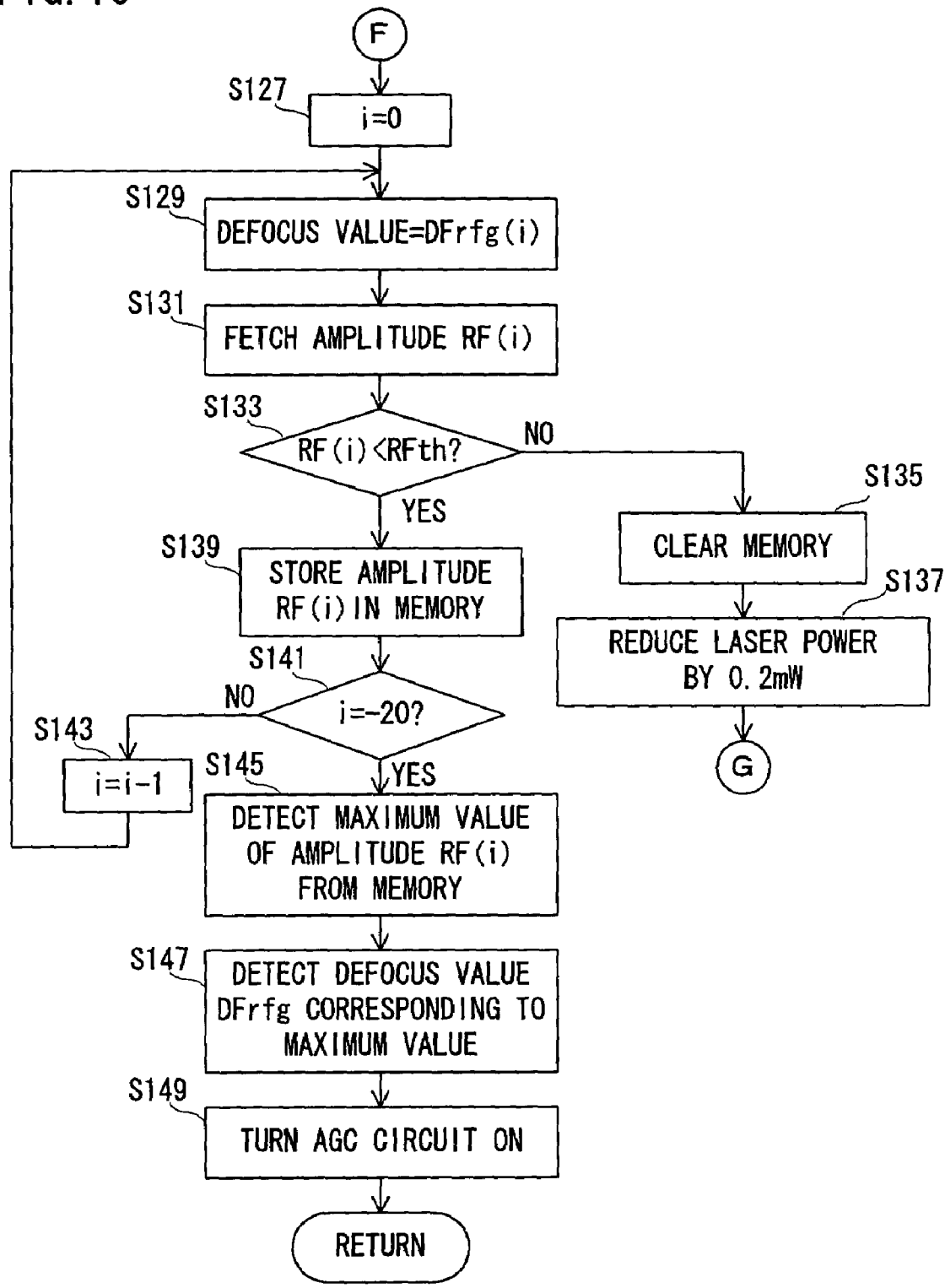
FIG. 16 is a flowchart showing the other part of the operation of the MPU when the focus offset value (defocus value) is detected.

At a time of detecting an offset, first, the spindle servo is turned on in a step S1 shown in FIG. 11, the magnetic head 38 is set on the magneto-optical disc 68 in a step S3, a laser diode 20 is turned on in a step S5, and the focus servo is turned on in a step S7. In the step S5, a reproduction laser power is set to the default value, and the laser diode 20 emits the laser beam to which a high frequency is superposed at the laser power of the default value. Furthermore, in the step S7, the defocus value of 0 is set to the DSP 44, and the optical lens 14 is deflected in the optical axis direction making the defocus value of 0 as a center.

The count value i of a counter 50a is set to "1" in a step S9, and a defocus value DFte(i) corresponding to a current count value (i) is set in the DSP 44 in a step S11. After completion of setting the defocus value, amplitude TE(i) is fetched from the amplitude measuring circuit 48 in a step S13, and the amplitude TE(i) is compared with a predetermined threshold value TEth in a step S15. Herein, if TE(i) <TEth, the amplitude TE(i) is stored in a work memory 50*b* in a step S21, and it is determined whether or not the count value i reaches "20" in a step S23. So long as the count value i does not reach "20", the counter 50*a* is incremented in a step S25 and then, the process returns to the step S11. On the other hand, if TE(i)≧TEth is determined in the step S15, the work memory 50*b* is cleared in a step S17, the laser power is reduced by 0.2 mW in a step S19, and then, the process returns to the step S9.

When the count value i reaches "20", the process proceeds from the step S23 to a step S27 so as to set the count value i to "0". The defocus value DFte(i) corresponding to the current count value i is set in the DSP 44 in a step S29, and the amplitude TE(i) is fetched from the amplitude measuring circuit 48 in a step S31. When the fetched amplitude TE (i) is below the predetermined threshold value TEth, the process proceeds form a step S39 to a step S41 so as to store the fetched amplitude TE(i) in the work memory 50*b*. In a step S43, the count value i is compared with "−20", and so long as the count value does not decrease up to "−20", the counter 50*a* is decremented in a step S45 and then, the process returns to the step S29. On the other hand, if the amplitude TE (i) is equal to or more than the predetermined threshold value TEth, the work memory 50*b* is cleared in a step S35, the laser power is reduced by 0.2 mW in a step S37, and then, the process returns to the step S9.

Figure 18:
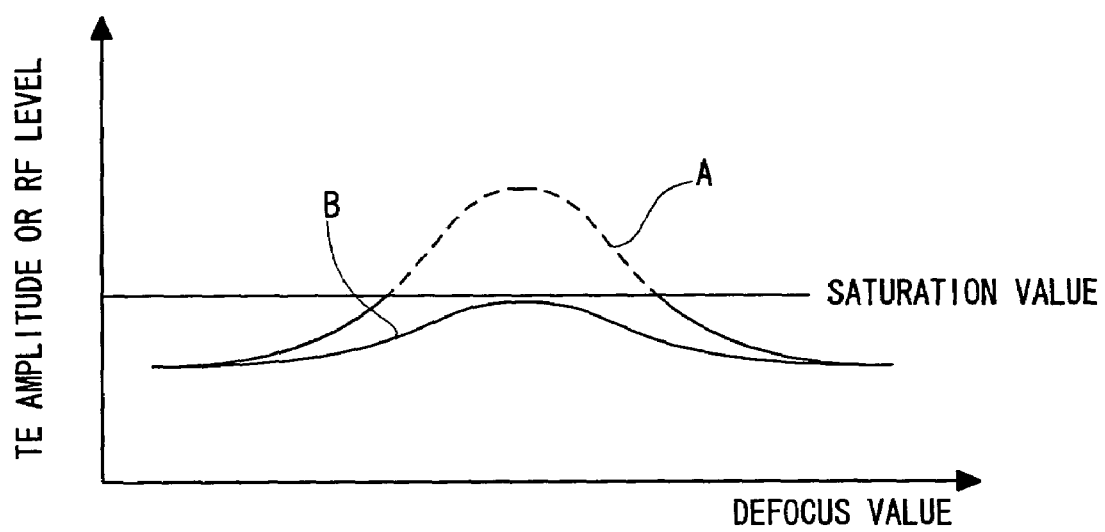
FIG. 18 is a waveform chart showing a relationship between a defocus value and amplitude of a TE signal or a level of an RF signal.

The predetermined threshold value TEth is a maximum value (saturation value) of a dynamic range of the TE signal, and it is impossible to determine the optimal defocus value DFte with using the amplitude TE(i) having a laser power exceeding the saturation value. That is, if the amplitudes TE(i) detected with respect to the respective defocus values DFte(i) are varied as shown by a curve A in FIG. 18 when a certain laser power is set, the optimal defocus value DFte cannot be determined. Therefore, when any one of the amplitudes TE(i) detected at the certain laser power is equal to or more than the predetermined threshold value TEth, the work memory 50*b* is cleared and the amplitudes TE(i) are detected at a lower laser power.

That "YES" is determined in the step S43 is when all the amplitudes TE (−20) to TE (20) detected at the certain laser power are below the predetermined threshold value TEth. At this time, the process proceeds from among the step S43 to a step S47 and detects the maximum value from the amplitudes TE (−20) to TE (20) stored in the work memory 50*b*. In a step S49, the defocus value corresponding to the detected maximum value is detected and determined to be the optimal defocus value DFte.

When the optimal defocus value DFte is determined, the processes in a step S51 and the subsequent are performed so as to determine the optimal defocus value DFrfl in which a measured level of the RF signal is maximized in the land track and the optimal defocus value DFrfg in which the measured level of the RF signal is maximized in the groove track.

First, a land test area is sought in the step S51, the tracking servo is turned on in a step S53, and test writing is performed on the land test area in a step S55. A recording laser power is set to the default value, and then, a pulse modulated laser beam is emitted from the laser diode 20. After completion of the test writing, the AGC circuit 62 is turned off in a step S57 and then, a reproduction laser power is set to the default value in a step S59. A writing signal recorded on the land test area is reproduced by the process in the step S59.

The counter 50*a* is set to "1" in a step S61, and the defocus value DFrfl(i) is set in the DSP 44 in a step S63. When the defocus value DFrfl(i) is set, the amplitude RF(i) is fetched from the amplitude measuring circuit 58 in a step S65, and the amplitude RF(i) is compared with the predetermined threshold value RFth in a step S67. Herein, if RF (i)<RFth, the amplitude RF(i) is stored in the work memory 50*b* in a step S73, and it is determined whether or not the count value i reaches "20" in a step S75. Then, so long as the count value is below "20", the counter 50*a* is incremented in a step S77 and then, the process returns to the step S77. On the other hand, if RF (i)≧RFth, "YES" is determined in the step S67, the work memory 50*a* is cleared in a step S69, the laser power is reduced by 0.2 mW in a step S71, and then, the process returns to the step S61.

If "YES" is determined in the step S75, the counter 50*a* is set to "0" in a step S79, and then, the defocus value DFrfl(i) is set in the DSP 44 in a step S81. The amplitude RF(i) is fetched from the amplitude measuring circuit 58 in a step S83, and the amplitude RF(i) currently fetched is compared with the predetermined threshold value RFth in a step S85. Then, if RF(i)<RFth, the amplitude RF(i) is stored in the work memory 50*b* in a step S91, and it is determined whether or not the count value is decreased up to "−20" in a step S93. Then, so long as i>−20, an increment process of the counter 50*b* is performed in a step S95 and then, the process returns to the step S81. On the other hand, if RF(i)≧RFth, "YES" is determined in the step S85, the work memory 50*a* is cleared in a step S87, the laser power is reduced by 0.2 mW in a step S89, and then, the process returns to the step S61.

When i=−20 is determined, the process proceeds from the step S93 to a step S97 so as to detect the maximum value out of the plurality of measured levels RF(i) corresponding to the current laser power stored in the work memory 50*b*. In a following step S99, the defocus value corresponding to the detected maximum value is determined to be the optimal defocus value DFrfl.

When the optimal defocus value DFrfl on the land track is determined, the processes from steps S101 to S149 are performed so as to determine the optimal defocus value DFrfl on the groove track; however, these processes are the same as the above-described steps S51 to S99 except that the test writing is performed on the groove test area in place of the land test area so as to reproduce a test signal from the groove test area, and except that the AGC circuit 62 being in an off state is turned on after determination of the optimal defocus value DFflg.

In the reproduction process, the process complies with a flowchart shown in FIG. 17. First, it is determined whether or not a reproduction instruction is applied in a step S151, and if "YES", the optimal defocus value DFte is set in the DSP 44 in a step S153. The focus servo has already been started, and the DSP 44 adjusts the focus on the basis of the FE signal and the optimal defocus value DFte. By the focus adjustment taking the optimal defocus value DFte into account, the amplitude of the TE signal output from the TE signal detection circuit 42 is maximized.

In a step S155, a reproduction destination track is sought on the basis of the TE signal having the maximum amplitude. When an irradiation destination of the main beam M reaches one track before the reproduction track, "YES" is determined in a step S157, and the tracking servo and the thread servo are turned on in a step S159 and a step S160, respectively. Furthermore, a seeking destination track is determined in a step S163, and if the seeking destination is the land track, the optimal defocus value DFrfl is set in the DSP 44 in a step S165, and if the seeking destination is the groove track, the optimal defocus value DFrfg is set in the DSP 44. The DSP 44 adjusts the focus on the basis of the FE signal and the optimal defocus value DFrfl or DFrfg, and whereby, the amplitude of the RF signal output from the RF signal detection circuit 60 is maximized.

When the irradiation destination of the main beam M reaches a target address, the process proceeds from a step S169 to a step S171, and the ECC decoder 66 is activated so as to perform a decoding process. When the decoding process is completed, the process is returned. In a case signals are dispersedly recorded by the FAT system or the UDF system, the above-described reproducing process is repeated many times, and whereby, the signals are intermittently reproduced by a predetermined amount.

As can be understood from the above-description, the laser beam is irradiated onto the recording surface of the magneto-optical disc 68 through the optical lens 14, and the TE signal or the RF signal is detected on the basis of the laser beam reflected by the recording surface. Herein, the MPU 50 displaces the optical lens 14 in the optical axis direction, and the TE signal detection circuit 42 or the RF signal detection circuit 60 detects the TE signal or the RF signal at each of displaced positions. The laser power is adjusted by the MPU 50 such that the amplitude of each of the detected TE signal or RF signal is below the saturation value. When the parameter is adjusted, the position of the optical lens 14 is controlled such that the amplitude of the TE signal or the RF signal detected thereafter is maximized. Therefore, it is possible to adequately reproduce the TE signal or the RF signal.

It is noted that although the laser power is reduced when the amplitude of the TE signal or the RF signal is equal to or more than the predetermined threshold value, GCAs (Gain Controlled Amplifier) 74 and 76 may be provided at the following portion of the TE signal detection circuit 42 and the RF signal detection circuit 60 as shown in FIG. 19 so as to reduce these gains. In this case, gains of the VCAs 68 and 70 need to be set to the default value in addition to setting the reproduction laser power to the default value in the respective steps S5, S59 and S107, and the gains of the GCAs 68 and 70 need to be decreased in place of decreasing the laser power in the respective steps S19, S37, S71, S89, S119 and S137.

Furthermore, although the defocus value in which the amplitude of the RF signal is maximized is determined to be the optimal defocus value DFrfl or DFrfg, the defocus value in which an error rate of the reproduction signal generated by the ECC decoder is minimized may be determined to be the optimal defocus value DFrfl or DFrfg.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disc apparatus, comprising:
an emitter for emitting a laser beam;
a lens for irradiating the laser beam emitted by said emitter onto a recording surface of a disc recording medium;
a first detector for detecting a first signal based on the laser beam reflected from said recording surface;
an actuator for actuating said lens in each of a plurality of positions assigned in a direction perpendicular to said recording surface;
a determiner for determining whether or not amplitude of the first signal detected by said first detector corresponding to the position of said lens actuated by said actuator is below a threshold value;
a setter for setting to said emitter a laser power in which said determiner determines that the amplitude of the first signal is below the threshold value with respect to every position actuated by said actuator;
a second detector for detecting, from among the plurality of positions noted by said actuator, a position at which the amplitude of the first signal detected by said first detector corresponding to the laser power set by said setter is maximum;
a controller for controlling a position of said lens based on the first signal detected by said first detector after a setting operation of said setter is completed and the position detected by said second detector; and
a reproducer for reproducing a second signal based on the laser beam reflected from said recording surface after start of a controlling operation of said controller.

2. A disc apparatus according to claim 1, wherein the first signal is an RF signal.

3. A disc apparatus according to claim 2, wherein said reproducer outputs the second signal by decoding the RF signal.

* * * * *